(12) United States Patent
Bach Corneliussen (10) Patent No.: US 7,231,420 B2
(45) Date of Patent: Jun. 12, 2007

(54) MULTI-USER APPLICATIONS IN MULTIMEDIA NETWORKS

(75) Inventor: Knut Snorre Bach Corneliussen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 591 days.

(21) Appl. No.: 10/037,487

(22) Filed: Jan. 4, 2002

(65) Prior Publication Data

US 2002/0156903 A1 Oct. 24, 2002
US 2005/0193123 A9 Sep. 1, 2005

(30) Foreign Application Priority Data

Jan. 5, 2001 (NO) .................................. 20010069

(51) Int. Cl.
*G06F 15/16* (2006.01)
(52) U.S. Cl. ...................... 709/203; 709/205; 709/227; 709/229; 709/230; 709/232
(58) Field of Classification Search ................ 709/203, 709/224, 204, 227, 225, 229, 230, 232, 205; 370/401; 713/200; 705/52
See application file for complete search history.

(56) References Cited

U.S. PATENT DOCUMENTS

| 6,502,131 | B1 * | 12/2002 | Vaid et al. | 709/224 |
| 6,732,177 | B1 * | 5/2004 | Roy | 709/227 |
| 6,775,255 | B1 * | 8/2004 | Roy | 370/331 |
| 6,829,243 | B1 * | 12/2004 | Sundhar | 370/401 |
| 2002/0075880 | A1 * | 6/2002 | Dolinar et al. | 370/401 |

* cited by examiner

*Primary Examiner*—Patrice Winder
*Assistant Examiner*—Liang-che Alex Wang
(74) *Attorney, Agent, or Firm*—Nixon & Vanderhye P.C.

(57) ABSTRACT

Problems related to operation and administration of multi-user application programs, particularly real-time applications, in systems of networked computers are solved using an enhancement of a selected call control protocol, such as the H.323 or SIP protocol. Each client, server, gatekeeper, and optional firewall of a system is provided with a specific real-time codec with a common interface adapted to a multimedia call control protocol, such as H.323 or SIP. The codec is adapted to cooperate with each of the client, sever, gatekeeper, and optional firewall. Thus, for example, each client can use its data communication protocol of choice without the need for the same data communication protocol choice on the server side of the application.

57 Claims, 6 Drawing Sheets

MULTI-USER APPLICATIONS IN MULTIMEDIA NETWORKS

FIELD OF THE INVENTION

The invention relates to the field of multi-user applications in systems of networked computers, and more particular to a multi-user computer system, method and arrangement employing multimedia call control, for alleviating problems of operation and administration of multi-user or real-time application programs in systems of networked computers.

THE PROBLEM AREAS

In systems with networked computers, it is often desirable to allow more than one user to interact with a single application at the same time (concurrently). Such applications are often called multi-user applications. Each multi-user application can be said to belong to one of the following two groups:
1) Multi-user applications with real time requirements; and,
2) Multi-user applications without real-time requirements.

Typical examples of applications that belong to the first group are multimedia conferencing applications and multi-player games, while multi-user white boarding and word processors with document sharing are typical examples of applications belonging to the second group.

When enabling more than one user to interact with the same application, typically, the users are each provided with parts of the application, hereinafter referred to collectively as clients. The clients then communicate with the remaining parts of the application, hereinafter referred to collectively as the server. The physical location of the server can be a computer shared with one of the participating clients, which typically is the case for word processor sharing and games, or it can be a separate computer such as a dedicated server computer. Use of a separate computer is quite common when the shared application needs more resources than what is available at the location of any of the clients.

A protocol is used for information exchange between the client and the server. Although several standard protocols exist, customised protocols that are optimised for each type of application are commonly employed. The reason for this is that each type of application has its own, specific needs. A typical shared real-time application will often make use of small data packets to increase transfer speed, while non-real time applications will often make use of larger data packets to decrease the use of communication channel bandwidth for the information exchange.

Network games can be, as mentioned earlier, typical examples of multi-user applications with real-time requirements. In network games, each client runs most of the application locally. This means that the clients send only information to the server about the positions in the game and the current status of their respective players (the type of information, sent and received, is of course dependent upon the type of game). The server then co-ordinates and combines the information received from all clients and sends co-ordinated and combined information back to the respective clients. If only a small number of users, say, less than ten, is supported, then the server is often located with one of the clients. If, on the other hand, a large number of concurrent users are allowed, then the need for computer resources would be greater, and the server in such cases are often assigned separate hardware.

When, in a networked system, each such multi-user application is using its own protocol, this represents a significant problem to the administrator of these protocols, as it is difficult, and sometimes even impossible, for the administrator to perform common administration of the supported multi-user applications. In this context, administration is defined as:

Methods for access control of who is allowed to communicate with the server

Trace logs of usage

Fault handling

Administration of addresses and users

All the needed logic to perform user billing of usage of the server

Other types of administration

Yet another problem encountered in such situations is to enable the different multi-user application protocols to pass through a firewall. This is especially difficult with multi-user applications with real-time requirements, because such applications often use the User Datagram Protocol (UDP) as a transport protocol. Due to the connectionless nature of UDP, it is difficult to allow UDP based traffic to pass through a firewall and at the same time obtain good protection by the firewall.

Another problem related to using one of the standard call control protocols for multi-user server communication is that the existing means for transporting information, hence not session initiation information, in current solutions are based on codecs that are optimised for voice, video or other non real-time data transfer. For transport of real-time data, these codecs are not suitable.

Furthermore, it would be beneficial if all multi-user applications that operate in one domain could use the same communication protocol. If they all make use of the same communication protocol, administration problems (e.g. access control, trace logs, etc.) and communication problems (e.g. enable communication through a firewall) could be solved for the common protocol, and hence be used by all multi-user application servers.

One suggested solution to the problem of administration is to implement separate support for administration of each type of application. The major problem with this method is, firstly, that for each new supported multi-user application the administration has to implement a new set of administration mechanisms, and secondly, that the administrator has to integrate the new set of administration mechanisms with existing administration for other multi-user applications.

Another suggested solution to the same problem is to support only multi-user applications that use a standardised protocol such as for example the Hyper-Text Transfer Protocol (HTTP). This, however, leads to other problems, as use of a single protocol will make it very difficult to make multi-user applications work in the network because of their different nature and their different resource requirements.

The problem of administration of different multi-user applications is solved using the H.323 standard according to ITU-T Recommendation H.323, 02/98 "Packet-based multimedia communications system", used for systems providing multi-media traffic. Establishing and administrating connections between clients and their respective servers by means of H.323 provides the advantage of allowing a system that includes application specific protocols as well as one common standard protocol, namely the H.323.

DETAILED DESCRIPTION

Figure 1:
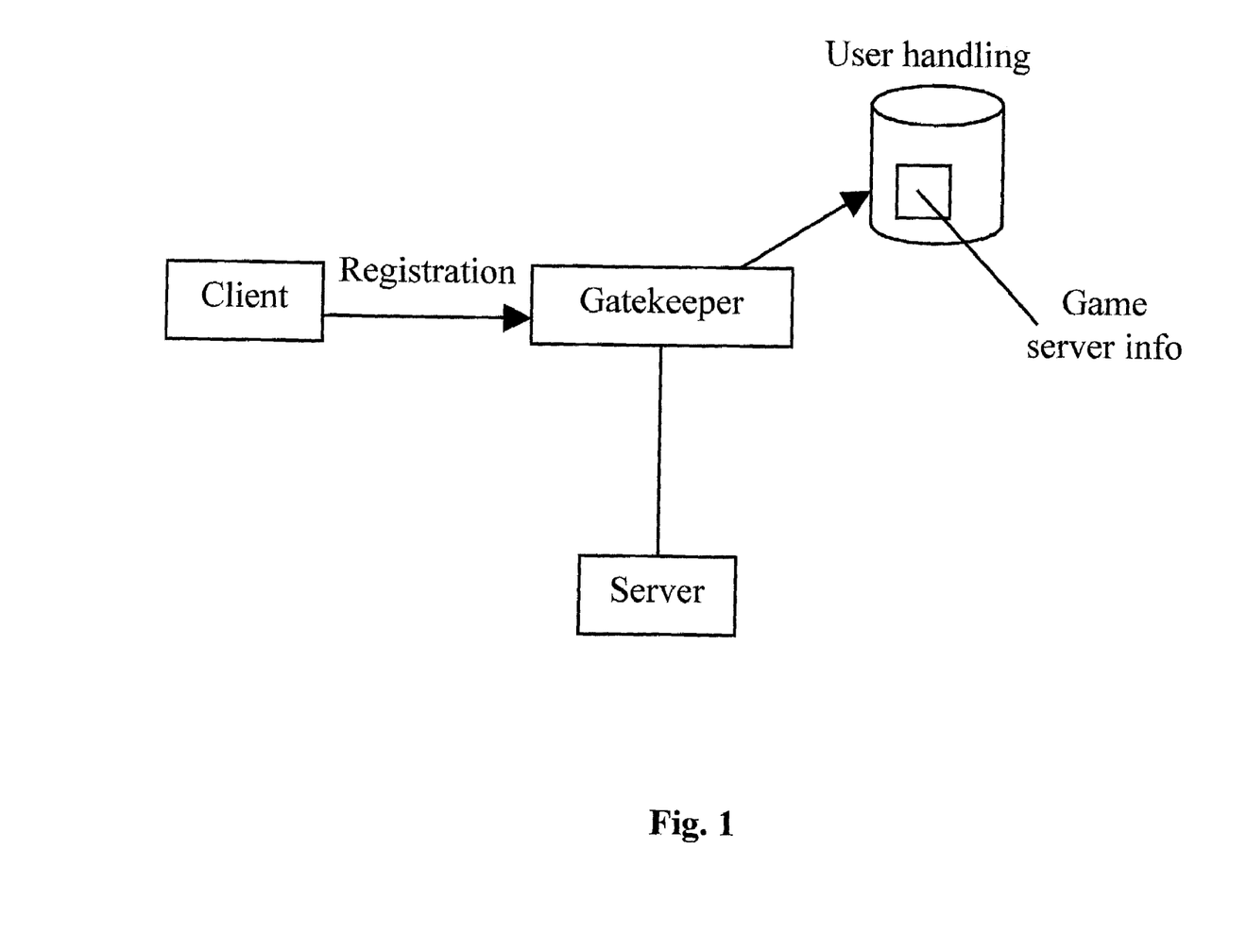
FIG. 1 is a block diagram representation of a simplified H.323 network example, illustrating client registration and authorisation.

Referring to FIG. 1, when the client is started, it first uses a known registration process of H.323 version 2 to be registered and authorised in the network. It should also be noted that, in the situation illustrated in FIG. 1, the server is already registered in the H.323 network. When using H.323, the client side of the application and the server side of the application must both support the H.323 stack. Further, to have full service, the server must be running all the time. Through the registration process, the user is authorised (authorisation is new in version 2 of H.323). This means that the operator can decide who is allowed to contact the server. Up to this point, conventions and interactions in the network are according to the known steps of the H.323 version 2.

Figure 2:
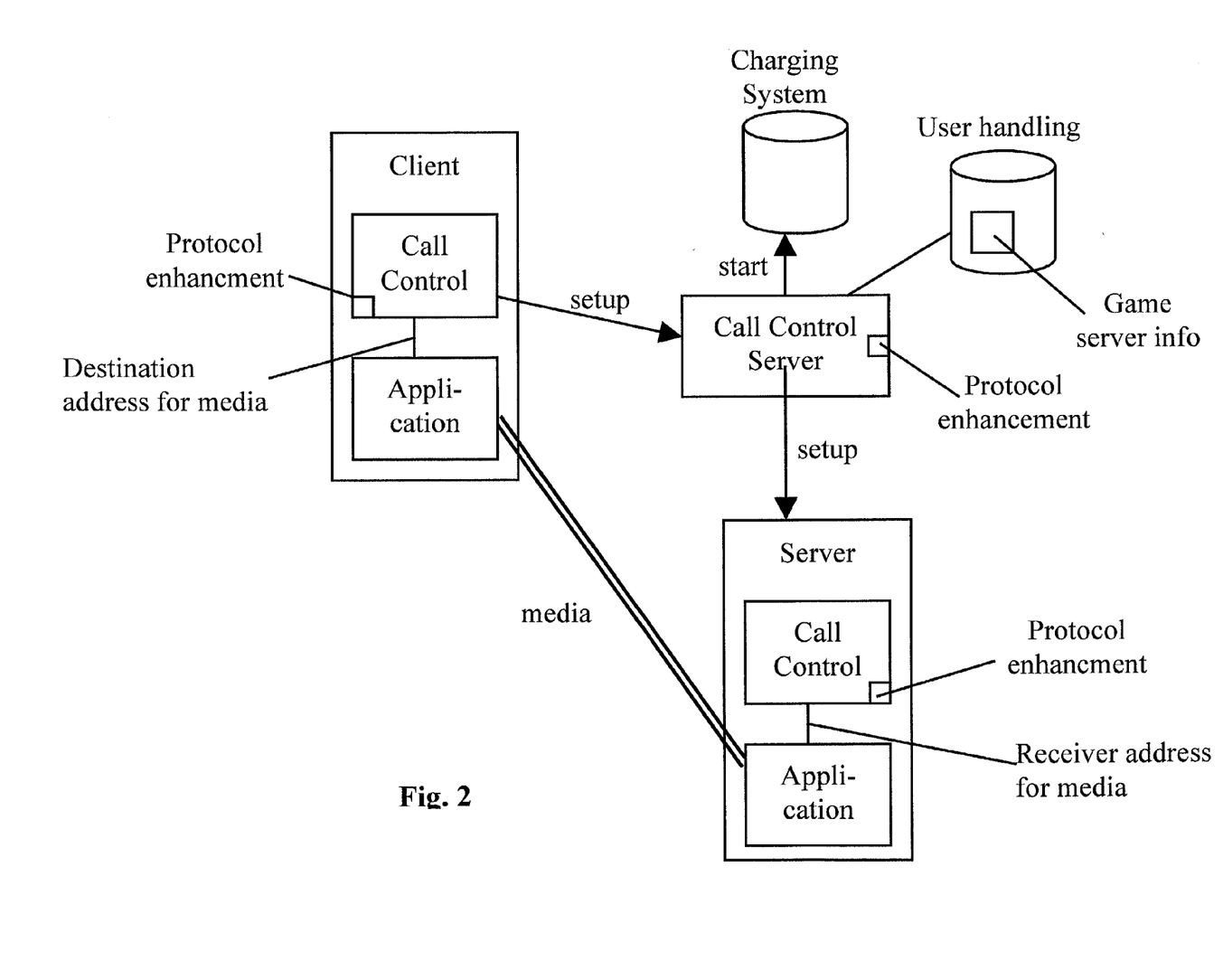
FIG. 2 is a block diagram representation of a simplified H.323 network illustrating set-up of a H.323 client-to-server network call and extended functions.

Now, referring to FIG. 2, when the client initiates a call with the gaming server as the destination, the gatekeeper will check in the user's profile, which is received from a User Handling Database (UHD), to see if the user is allowed to use the gaming server, denoted by Gaming Server Info. In order to fetch this data and to perform the evaluation, new functionality is added to a H.323 Gatekeeper. If the user is found to be allowed to "call" the gaming server, then the gatekeeper informs the client that he is allowed to make the call set-up as is typically done according to H.323.

Then the client starts the data channel of H.323 towards the server. This is allowed according to H.323, although it is not usually done this way as the procedure usually employed is to start voice and video channels. According to one example of the invention, the H.323 protocol is extended to support a new codec. This is shown below:

For the purpose of simplifying the explanation of by way of example, in the following, H.323 and H.323 names and terms will be employed extensively. A new codec that is specialised for real-time data transfer is employed. In H.323 the new codec is identified in the ASN.1 syntax as described below:

```
DataApplicationCapability        ::=SEQUENCE
{
    application              CHOICE
    {
        nonStandard      NonStandardParameter,
        t120             DataProtocolCapability,
        dsm-cc           DataProtocolCapability,
```

-continued

```
        userData         DataProtocolCapability,
        t84              SEQUENCE
        {
            t84Protocol  DataProtocolCapability,
            t84Profile              T84Profile
        },
        t434             DataProtocolCapability,
        h224             DataProtocolCapability,
        nlpid            SEQUENCE
        {
            nlpidProtocol   DataProtocolCapability,
            nlpidData       OCTET STRING
        },
        dsvdControl NULL,
        h222DataPartitioning    DataProtocolCapability,
        ...,
        t30fax           DataProtocolCapability,
        t140             DataProtocolCapability
        A new codec type DataProtocolCapability
    },
    maxBitRate                  INTEGER (0. . .4294967295),
    -- units 100 bit/s
    ...
}
```

This basis for the ASN.1 code shown above is described in ITU-T Recommendation H.245, 02/98 "Control protocol for multimedia communication". The code above, being an amended code applicable to solutions according to H.245, shows how the Data Application field of the H.245 protocol is extended. Such adaptation of H.245 is included in all clients, servers, and gatekeepers having registered gaming servers (if the gatekeeper is routing H.245). In this context, the particular name of the new codec is not relevant, just that it is new. Any requirement for more than one new codec in a particular system depend on the requirements defined for the communication between the client and the different types of gaming servers. Regardless, a game server and its connected clients must provide support for the same codec type.

The new codec is designed in a simple fashion, meaning that it requires little overhead. In the following, example some of the characteristics of the new codec are given:

The codec uses RTP (Real-time transport Protocol) over UDP (User Datagram Protocol) to obtain real-time transport The codec includes mainly two types of messages: a) a data message, and b) a control message.

The data message can be sent from the client or from the server. The control message is only sent from the server.

Figure 4:
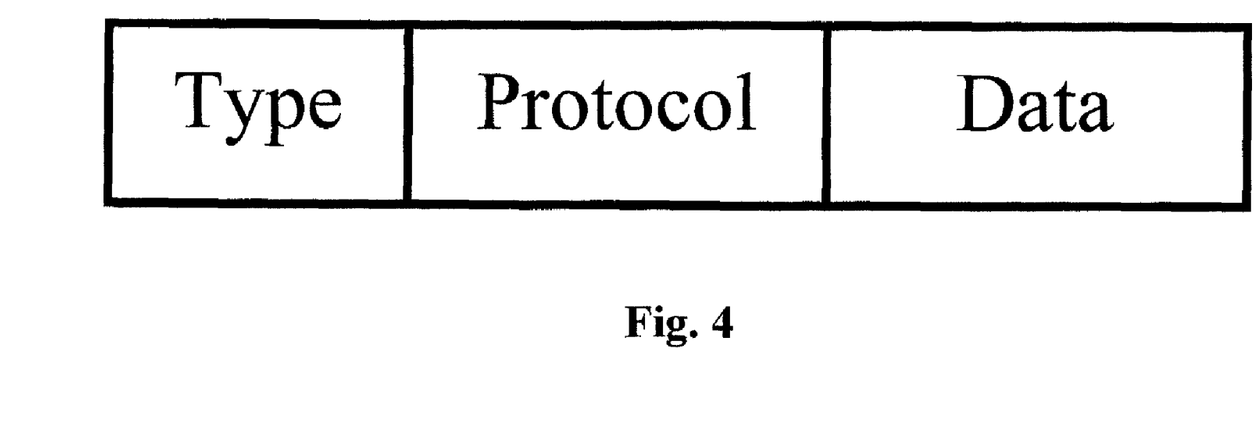
FIG. 4 is a schematic representation of an embodiment of a user data packet structure of the invention.

Referring to FIG. 4, an example of a data packet of the new codec will now be explained:

In the Type field is an identifier defining the type of message is (e.g. 1=data message, 2=control message); which in this case is a data message.

In the Protocol field is an identifier defining how the data in the rest of the message shall be interpreted. Note that there has to be a common understanding of the data format among client and server.

In the Data field is included the data that is sent from the client or from the server Referring now to FIG. 5, an example of a control packet of the new codec will be explained:

In the Type field is an identifier defining the type of message is (e.g. 1=data message, 2=control message); which in this case is a control message.

In the Protocol field is an identifier defining how the Control information in the rest of the message shall be interpreted. Note that there has to be a common understanding of the control format among client and server.

In the Data field is included the control information that is sent from the server towards the clients. Examples of control information are how often data messages shall be sent from the client towards the server, and how often the server will send data messages towards the client.

Note that time-stamps and sequence numbers are not part of the codec messages, because this information typically can be obtained from the RTP header.

Now, with reference to the accompanying FIGS. 6 and 7, and by way of example, information exchange in a client-server configuration in an embodiment will be explained. The referenced FIGS. 6 and 7 generally show examples of the communication sequence between a client and a server. In the sequence examples shown, there are some common steps. The client initiates the communication by sending a "setup" message according to the standard call control protocol which has been selected; that is, for example, H.323 or SIP. Then the server signals acceptance of the incoming "setup" by sending an accept message according to the selected call control protocol. The call control part of the client then sends a suggested media set and address, including the new codec. Further, as shown in the examples, the suggested media set is accepted by the server by a message that also includes the media destination address to which the client is to send the media. At this point in the sequence, two different possibilities are available. One possibility is that the address is sent from the Call control towards the application part in both the server and the client, in which case it is the application on the client that sends the media using the new codec directly towards the application on the server. This first possibility is illustrated by the further parts of the sequence shown in FIG. 6. The other possibility is that the Call control on both the server and client sends a "start" message, or a similar kind of information, indicating that communication is now established between the server and the client. In this latter case, media sent in the new codec is first transmitted from the application towards the Call control and then from the Call control on one side over to the other Call control, and then on to the application. This other possibility is illustrated by the further parts of the sequence shown in FIG. 7. At the termination of a session, the client send a "close" message. However, closing can also be initiated by the server. The entity receiving the "close" message informs the application that the session is over, and responds to the "close" message by sending back an "accept" message.

Now, with reference to FIGS. 4, 5, 6 and 7, the message types and their use will be explained by way of example. In accordance with a sequence as described above, the sever can first send a control message including information specifying the rate at which data is to be be sent from the client to the server, and possibly also information about the data type. In turn, the client sends data to the server at the specified rate and of the specified type, according to the scheme specified in the control message. Such control messages can be sent at any time during a session, in order for the server to specify different data rates and data types according to the needs of the application associated with the session.

Figure 6:
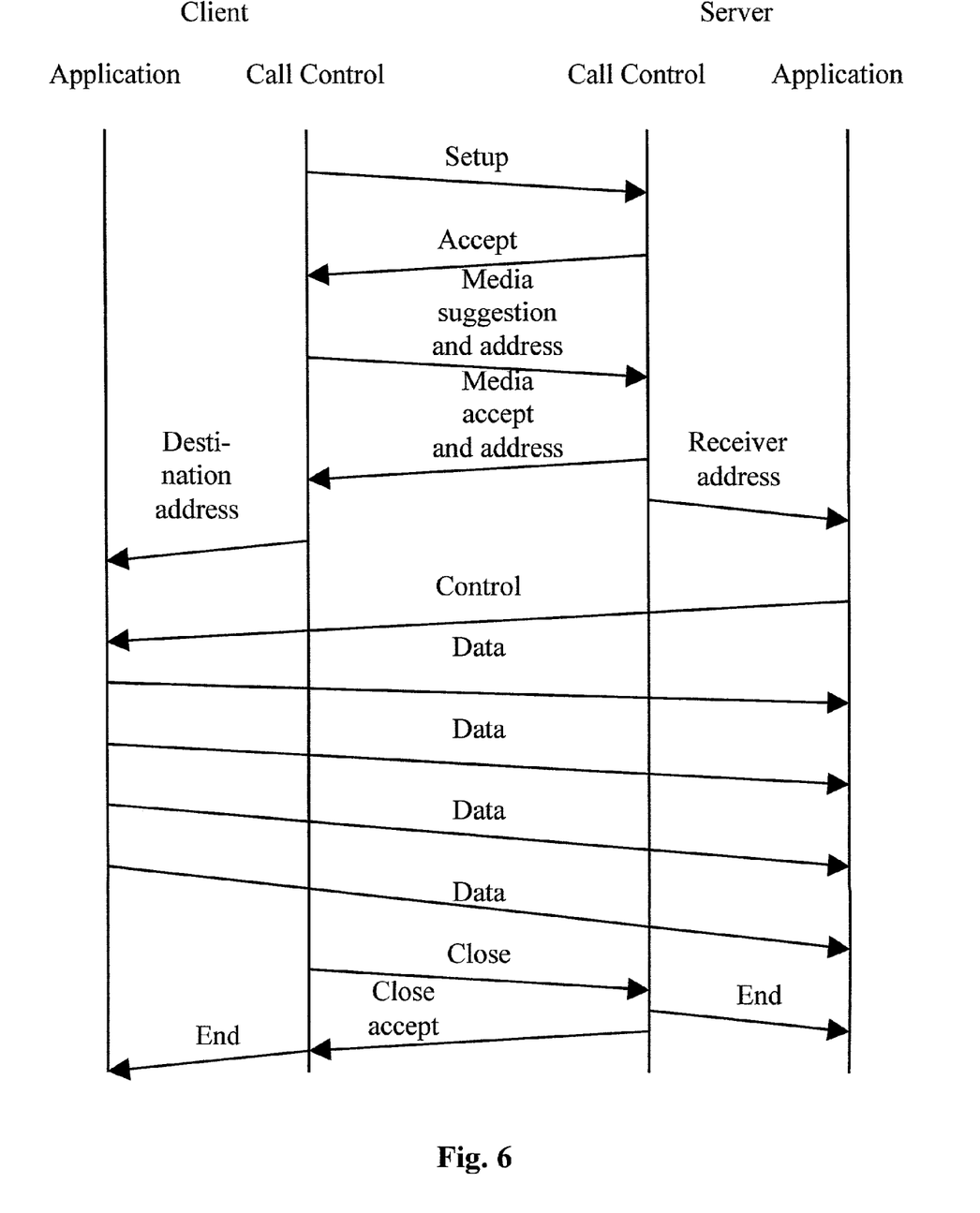
FIG. 6 is a sequence diagram illustrating an example of information exchange between server and client in an exemplary embodiment of a solution according to the invention.
Figure 7:
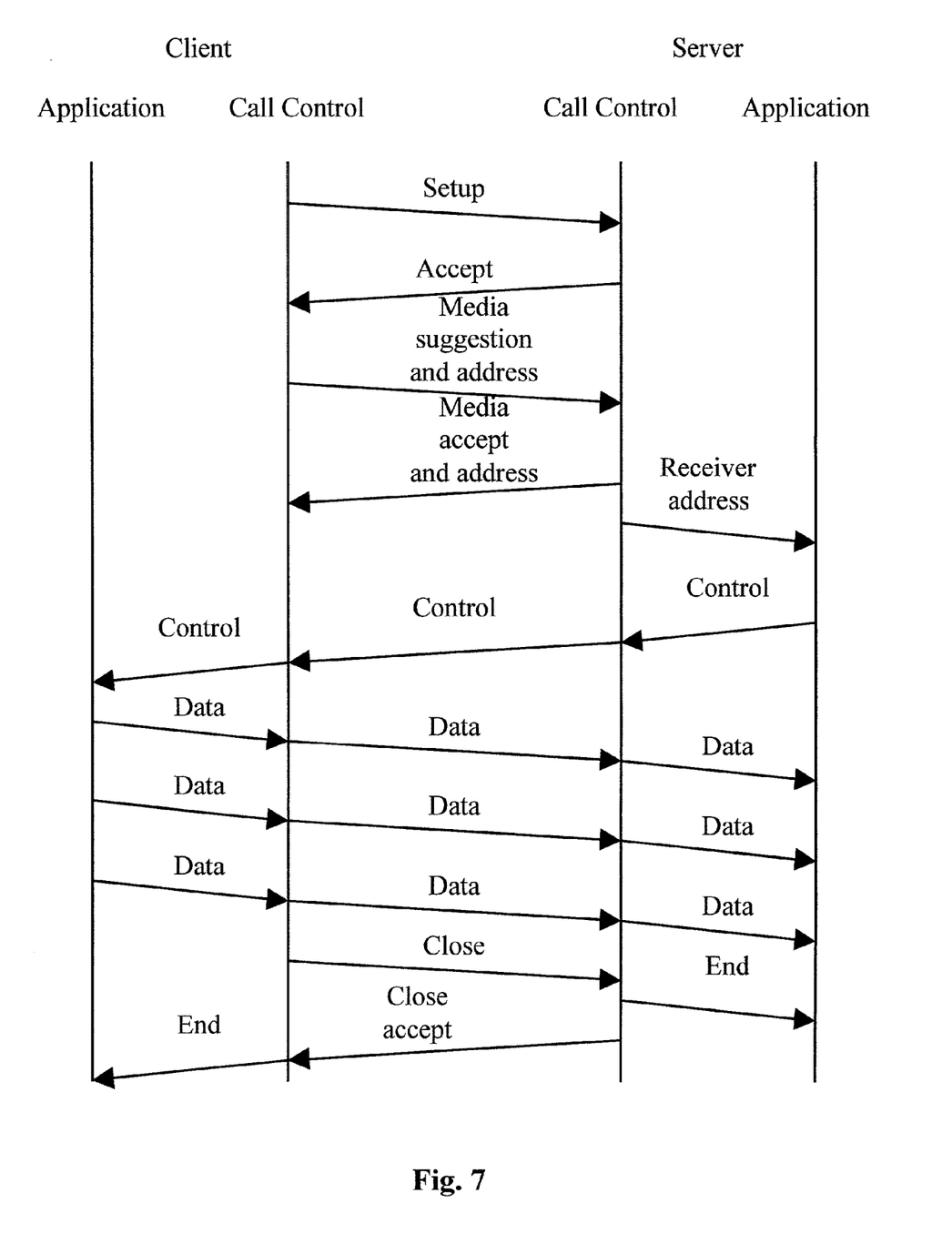
FIG. 7 is a sequence diagram illustrating an example of information exchange between server and client in another exemplary embodiment of a solution according to the invention.

With reference to the sequences explained above, it should be noted that the different possibilities illustrated by FIGS. 6 and 7 also can be mixed or combined, in such a way that either the server party or the client party follows one of the sequences, while the other party follows the other sequence.

In H.323 networks with gatekeepers, all signalling must go through the gatekeeper. When the gatekeeper allows set-up and operation of a call, it can, according to known H.323 architecture and implementations, inform the normal charging system of that usage has started. A charging system can be added to a system, such as the system depicted in FIG. 1, in a number of different ways. A simple and effective way of accomplishing charging, is that the gatekeeper writes information related to call-setup and stop to an ASCII-file. A program can process this file by manual or automatic means at a later stage in time. A more advanced solution is to send Call Detail Records (CDR) to an external system. CDRs can include information about call start time, call stop time, activity, resources used, etc. The external system can then be made to automatically interpret these records and produce a cost of use (charging) to the end-user directly.

Figure 3:
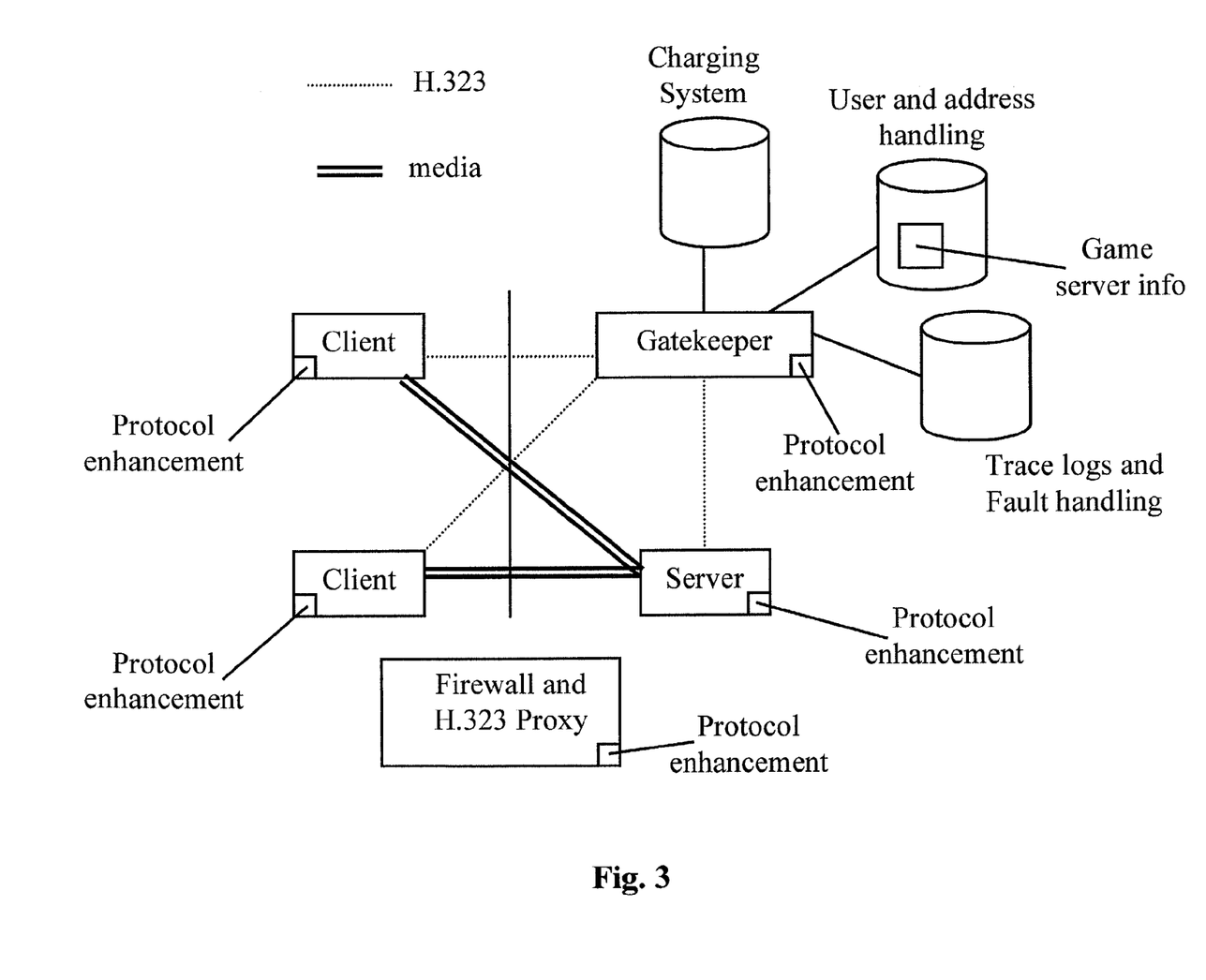
FIG. 3 is a block diagram representation of a simplified H.323 network illustrating client-server information exchange according to the invention through a firewall.
Figure 5:
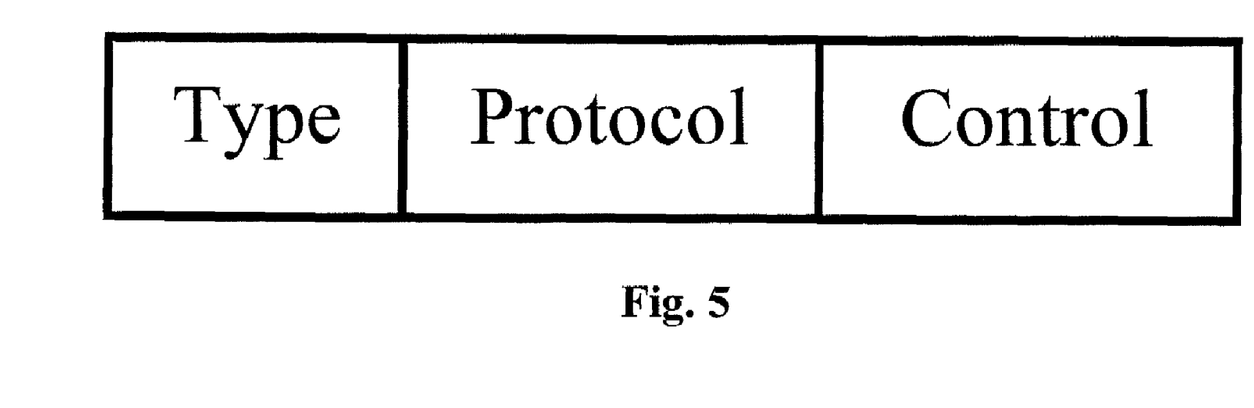
FIG. 5 is a schematic representation of an embodiment of a control data packet structure of the invention.

Further, as illustrated in FIGS. 6 and 7, when seen in conjunction with the messages describe with reference to FIGS. 4 and 5, when establishing the data channel, the client informs the server of which protocol to use for the data communication using the new codec as described above. This means that the applications themselves can use whichever protocol they desire, as long as it maps into the new codec type. During the H.323 set-up phase, both the client and the server also inform each other of ports on which they want to receive data, and of which transport protocol is to be used, such as e.g. whether they use TCP (Transmission Control Protocol) or UDP (User Datagram Protocol). This information can further be used by a H.323 Proxy to enable the chosen data protocol to be transferred through a firewall, as illustrated in FIG. 3. If an H.323 proxy is used, it also will be updated with the enhanced H.323 protocol.

Referring to FIG. 3, an example is shown, wherein two clients communicate with the server. They use both the H.323 protocol, which is sent via the gatekeeper, and the chosen data protocol directly. When the data channel is established, the client informs the server of which protocol to use for the data communication. This means that the applications can use any preferred protocol. In FIG. 3 a firewall is also shown together with a H.323 proxy. The reason for including the proxy functionality is two fold. Firstly, it is quite common to have a firewall at every enterprise and ISP to protect their respective areas. Secondly, NAT (Network Address Translation) is often used by enterprises for sharing one single IP-address, and for not giving away information about IP-address for nodes located inside the domain of the enterprise. H.323 does not include support for NAT and proxies in itself, but by using the H.323 proxy, the IPT solution alleviates the limitations of the H.323 v2 standard related to communicating with endpoints located behind firewalls.

In accordance with the above, the H.323 Proxy contains the following functions:

The H.323 proxies the RAS signalling (registration and admission), and replaces the internal IP addresses of the enterprise in the RAS messages with public IP addresses (NAT-Network Address Translation).

The H.323 proxies the Q.931 signalling (call set-up), and replaces the enterprise internal IP addresses in the Q.931 message with public IP addresses.

The H.323 proxies the H.245 signalling (media channel set-up), and replaces the enterprise internal IP address in the H.245 messages with public IP addresses. If the endpoint uses H.245 in a separate channel the H.323 proxy transforms this to a tunnelled H.245 since the IPT system always uses tunnelled H.245.

The H.323 proxy controls the media streams that are set-up as a result of the H.245 signalling, and proxies the media streams (media stream NAT).

From the example described above, and as illustrated by FIG. 3, it should be noted that the chosen data protocol can be sent through a firewall when using a H.323 proxy.

The procedure of authenticating H.323 end-user in H.323 systems is specified in H.323. However, it is only specified how the user name and password can be sent from an end-user to the gatekeeper. To obtain true authentication, a means for checking the username against the password must be added to the system. One way of allowing this check to be accomplished is, as illustrated in the accompanying FIGS. 1, 2 and 3, to add a database to the gatekeeper. This database will at least include a record for each user containing a username and a password. The gatekeeper will then check if the end-user exist in the database. If the end-user exists in the database, then the gatekeeper obtains the password of the user and checks to see if it matches the password received by the end-user. The database and its associated logic is in this solution referred to as the User Handling. The data that determines if the user is to be allowed to make a call can be added to the user record stored for each user in the database described above.

During the H.323 set-up phase, the client and the server also both inform each other of on which ports they want to receive data and of whether they are using the Transmission Control Protocol (TCP) or UDP. This information can be used by a H.323 Proxy to enable the chosen data protocol to be transferred through a firewall.

When the set-up phase is over, the respective client and server use the chosen protocol that is optimised for their needs to transfer data to each other.

When the session is over, the client closes the connections and informs the gatekeeper. The gatekeeper then informs the charging system that the usage of the server has stopped. If a client should become inoperable or a network failure should occur, then the system can also detect this because H.323 requires regular updates of the status of the "call". A correct record of time of usage is therefore guaranteed.

Although only a simple H.323 network is shown in the FIGS. 1, 2 and 3 to simplify the drawings for the purpose of explanation, the solution described will also work in large-scale H.323 networks or in networks having an architecture and/or operating according to similar call control protocols, such as for example the SIP protocol.

By using H.323, the applications can easily be integrated with voice and video if they do not already have this support. This will give some application a new dimension without the need for making large changes the application required otherwise. When using H.323, the client does not need to know the IP(Internet Protocol)-address of the server, as the H.323 supports more advanced address schemes like E-164 numbers, e-mail addresses, or aliases.

Having described my invention, I claim:

1. A computerized server/client gaming arrangement for using a H.323 network for communicating multimedia gaming data between a gaming server and a plurality of gaming clients, wherein the H.323 network is configured to be controlled by a gatekeeper node, wherein the gaming server includes a multi-user shared real-time gaming server application operable on a server node computer having a server node H.323 multimedia call client, and wherein the gaming clients include real-time gaming client applications operable on respective client node computers having respective client node H.323 multimedia call clients, and wherein the server node H.323 multimedia call client includes a server node gaming related protocol enhancement including a respective server node codec, wherein the server node codec is configured to use RTP over UDP packet communication, to encode gaming server output control information into a gaming control information data packet containing a type field, a protocol field, and a data field, and to decode gaming server input data information from a gaming data information data packet containing a type field, a protocol field, and a data field, and wherein the client node H.323 multimedia call clients each include a client node gaming related protocol enhancement including a respective client node codec, wherein the client node codec is configured to use RTP over UDP packet communication, to decode gaming client input control information from the gaming control information data packet, and to encode gaming client output data information into the gaming data information data packet containing a type field, a protocol field, and a data field.

2. The computerized server/client arrangement of claim 1, wherein the type field includes a data message identifier or a control message identifier.

3. The computerized server/client arrangement of claim 1, comprising a means for generating a control information time stamp from time information of a header of a RTP data packet carrying the control information and a data information time stamp from time information of a header of a RTP data packet carrying the data information.

4. The computerized server/client arrangement of claim 1, comprising a means for generating a control information sequence number from sequence number information of a header of a RTP data packet carrying the control information and a data information sequence number from sequence number information of a header of a RTP data packet carrying the data information.

5. The computerized server/client arrangement of claim 1, wherein the server node and client node codecs are provided by a common real-time gaming codec being identified to any of the server node and client node H.323 multimedia call clients by an ASN.1 listing according to ITU Recommendation H.245, 02/98.

6. The computerized server/client arrangement of claim 1, wherein the control information includes information specifying a rate at which data is to be sent to the server.

7. The computerized server/client arrangement of claim 6, wherein the control information includes information specifying a data type to which the rate at which data is to be sent to the server is applicable.

8. The computerized server/client arrangement of claim 1, wherein the gatekeeper node includes a gatekeeper node gaming related protocol enhancement having at least one of the server node or client node codecs and a gaming server use monitoring arrangement, and wherein the gaming server use monitoring arrangement is configured to cooperate with the gatekeeper node gaming related protocol enhancement to create a gaming server use billing record.

9. The computerized server/client arrangement of claim 1, further comprising at least one firewall and an H.323 proxy associated with any of the gatekeeper node, gaming server, or gaming client, wherein the firewall and H.323 proxy include a third gaming related protocol enhancement including at least one of the server node or client node codecs.

10. The computerized server/client arrangement of claim 1, wherein the H.323 network comprises a call control element configured to send, in response to a set-up message from the server node or client node H.323 multimedia call clients, a media destination address to the gaming server and the gaming client, and wherein the gaming client is configured to send media directly to the media destination address using the client node codec at the gaming client and the server node codec at the gaming server.

11. The computerized server/client arrangement of claim 1, wherein the H.323 network provides a call control element configured to send, in response to a set-up messages from the client node H.323 multimedia call client or the server node H.323 multimedia call client, a media destination address to a gaming client call control device associated with the gaming client or to a gaming server call control device associated with the gaming server, respectively, wherein the gaming client and the gaming server are configured to communicate media, using respective ones of the gaming client and gaming server call control devices, via respective ones of the client node and server node codecs, and wherein the gaming client and gaming server call control devices are configured to terminate the communication of the media in response to a close message from the client node H.323 multimedia call client or the server node H.323 multimedia call client.

12. A method for communicating over a H.323 network multimedia gaming data between a gaming server and a plurality of gaming clients, wherein the H.323 network is controlled by a Gatekeeper node, wherein the method is implemented using a multi-user shared real-time gaming server application operable on a server node computer having a server node H.323 multimedia call client and gaming clients including real-time gaming client applications operable on respective client node computers having respective client node H.323 multimedia call clients, the method comprising:

providing the server node H.323 multimedia call client with a server node gaming related protocol enhancement including a respective server node codec;

the server node codec using RTP over UDP packet communication to encode gaming server output control information into a server node data packet containing a type field, a protocol field, and a data field;

the server node codec using RTP over UDP packet communication to decode gaming server input data information from a gaming data information data packet containing a type field, a protocol field, and a data field;

providing the client node H.323 multimedia call clients with a client node gaming related protocol enhancement including a respective client node codec;

the client node codec using RIP over UDP packet communication to decode gaming client input control information from the server node data packet; and the client node codec using RTP over UDP packet communication to encode gaming client output data information into the gaming data information data packet.

13. The method of claim 12, wherein the type field includes a data message identifier or a control message identifier.

14. The method of claim 12, further comprising generating a control information time stamp from time information of a header of a RTP data packet carrying the control information and a data information time stamp from time information of a header of a RTP data packet carrying the data information.

15. The method of claim 12, further comprising generating a control information sequence number from sequence number information of a header of a RTP data packet carrying the control information and a data information sequence number from sequence number information of a header of a RTP data packet carrying the data information.

16. The method of claim 12, wherein the server node and client node codecs are provided by a common real-time gaming codec being identified to any of the server node and client node H.323 multimedia call clients by an ASN.1 listing according to ITU Recommendation H.245, 02/98.

17. The computerized server/client arrangement of claim 12, wherein the control information includes information specifying a rate at which data is to be sent to the server.

18. The computerized server/client arrangement of claim 12, wherein the control information includes information specifying a data type to which the rate at which data is to be sent to the server is applicable.

19. The computerized server/client arrangement of claim 12, wherein the gatekeeper node includes a gatekeeper node gaming related protocol enhancement having at least one of the server node or client node codecs and a gaming server use monitoring arrangement, the method further comprising the gaming server use monitoring arrangement cooperating with the gatekeeper node gaming related protocol enhancement to create a gaming server use billing record.

20. The computerized server/client arrangement of claim 12, wherein the H.323 network includes a call control element that sends, in response to a set-up message from the client node H.323 multimedia call client, a media destination address to the gaming server and the gaming client, and wherein the gaming client is configured to send media directly to the media destination address using the client node codec at the gaming client and the server node codec at the gaming server.

21. The computerized server/client arrangement of claim 12, wherein the H.323 network includes a call control element that sends, in response to set-up messages from the client node H.323 multimedia call client or the server node H.323 multimedia call client, a media destination address to a gaming client call control device associated with the gaming client or to a gaming server call control device associated with the gaming server, respectively, wherein the gaming client and the gaming server communicate media, using respective ones of the gaming client and gaming server call control devices, via respective ones of the client node and server node codecs; and wherein the gaming client and gaming server call control devices terminate the communication of the media in response to a close message from the client node H.323 multimedia call client or the server node H.323 multimedia call client.

22. A gaming client node for a computerized server/client gaming arrangement for using a H.323 network to communicate multimedia gaming data between a gaming server and a plurality of gaming clients, wherein the H.323 network is configured to be controlled by a gatekeeper node, wherein the gaming server is a multi-user shared real-time gaming server application operable on a server node having a server node H.323 multimedia call client, wherein the gaming client node comprises:

a gaming client means being a real-time gaming client application, and a client node H.323 multimedia call client having a client node gaming related protocol enhancement including a client node codec, wherein the client node codec is configured:
a) to use RTP over UDP packet communication in communicating with the server node,
b) to decode gaming client input control information from a gaming control information data packet generated in the server node by a server node codec of a server node gaming related protocol enhancement of the server node H.323 multimedia call client, wherein the server node codec is configured to use RTP over UDP packet communication and to encode gaming server output control information for use as gaming client input control information into the gaming control information data packet containing a type field, a protocol field, and a data field, and
c) to encode gaming client output data information into a gaming data information data packet decodable by the server node codec of the server node gaming related protocol enhancement of the server node H.323 multimedia call client, wherein the gaming data information data packet contains a type field, a protocol field, and a data field.

23. The gaming client node of claim 22, wherein the type field includes a gaming data message identifier or a gaming control message identifier.

24. The gaming client node of claim 22, further comprising a means for generating a control information time stamp from time information of a header of a RTP data packet carrying the gaming control information or a means for generating a data information time stamp from time information of a header of a RTP data packet carrying the gaming data information.

25. The gaming client node of claim 22, further comprising a means for generating a control information sequence number from sequence number information of a header of a RTP data packet carrying the control information or a data information sequence number from sequence number information of a header of a RTP data packet carrying the data information.

26. The gaming client node of claim 22, wherein the client node and server node codecs are provided by a common real-time gaming codec being identified to any of the server node and client node H.323 multimedia call clients by an ASN.1 listing according to ITU Recommendation H.245.

27. The gaming client node of claim 22, wherein the control information includes information specifying a rate at which data is to be sent to the server.

28. The gaming client node of claim 27, wherein the gaming control information includes information specifying a data type to which the rate at which data is to be sent to the server node is applicable.

29. The gaming client node of claim 22, wherein the gatekeeper node is a gatekeeper node comprising a gatekeeper node gaming related H.323 protocol enhancement according to at least one of the client node and server node codecs, and a gaming server use monitoring arrangement, wherein the gaming server use monitoring arrangement is configured to cooperate with the gatekeeper node gaming related H.323 protocol enhancement to create a gaming server use billing record.

30. The gaming client node of claim 22, further comprising at least one firewall and a H.323 proxy associated with any one of the gatekeeper node, the gaming server node or the gaming client node, wherein the firewall and H.323 proxy includes a client node gaming related H.323 protocol enhancement including a at least one of the client node and server node codecs.

31. The gaming client node of claim 22, wherein the H.323 network comprises a call control element configured to send, in response to a set-up message from the client node, a media destination address to the gaming server node and the gaming client node, and wherein the gaming client node is configured to send media directly to the media destination address using the client node codec at the gaming client node and the server node codec at the gaming server node.

32. The gaming client node of claim 22, wherein the H.323 network comprises a call control element configured to send, in response to set-up messages from the client node and the server node, respectively, a media destination address to a client call control device associated with the gaming client node and to a server call control device associated with the gaming server node, wherein the gaming client and the gaming server nodes are configured to send media to respective ones of the client and server call control devices via respective ones of the client node and server node codecs, and wherein the client and server call control devices are configured to communicate the media to each other.

33. A gaming server node for a computerized server/client gaming arrangement for using a H.323 network to communicate multimedia gaming data between a gaming server and a plurality of gaming clients, wherein the H.323 network is controlled by a gatekeeper node, wherein the gaming clients are real-time gaming client applications operable on respective gaming client nodes having respective client node codecs of gaming related protocol enhancements of respective client node H.323 multimedia call clients, wherein the gaming server node comprises:

a gaming server means being a multi-user shared real-time gaming server application, and
a server node H.323 multimedia server client having a server node gaming related protocol enhancement including a server node codec, wherein the server node codec is configured:
a) to use RTP over UDP packet communication in communicating with the client node,
b) to encode gaming server output control information into a gaming control information data packet for use as gaming client input control information, wherein the gaming control information data packet contains a type field, a protocol field, and a data field, and is decodable by the client node codec of the gaming related protocol enhancement of the client node H.323 multimedia call client, and
c) to decode gaming client output data information from a gaming data information data packet generated by the client node codec of the gaming related protocol enhancement of the client node H.323 multimedia call client, wherein the gaming data information data packet includes a type field, a protocol field, and a data field.

34. The gaming server node of claim 33, wherein the type field includes a gaming data message identifier or a gaming control message identifier.

35. The gaming server node of claim 33, further comprising a means for generating a control information time stamp from time information of a header of a RTP data packet carrying the gaming control information, or a means for generating a data information time stamp from time information of a header of a RTP data packet carrying the gaming data information.

36. The gaming server node of claim 33, further comprising a means for generating a control information sequence number from sequence number information of a header of a RTP data packet carrying the control information, or a means for generating a data information sequence number from sequence number information of a header of a RTP data packet carrying the data information.

37. The gaming server node of claim 33, wherein the client node and server node codecs are provided by a common real-time gaming codec being identified to any of the server node and client node H.323 multimedia call clients by an ASN.1 listing according to ITU Recommendation H.245.

38. The gaming server node of claim 33, wherein the gaming control information includes information specifying a rate at which data is to be sent to the server.

39. The server node of claim 38, wherein the gaming control information includes information specifying a data type to which the rate at which data is to be sent to the server node is applicable.

40. The gaming server node of claim 33, wherein the gatekeeper node is a gatekeeper node comprising a gatekeeper node gaming related H.323 protocol enhancement according to at least one of the client node and server node codecs, and a gaming server use monitoring arrangement configured to cooperate with the gatekeeper node gaming related H.323 protocol enhancement to create a gaming server use billing record.

41. The gaming server node of claim 33, further comprising at least one firewall and H.323 proxy associated with any one of the gatekeeper node, the gaming server node or the gaming client node, wherein the firewall and H.323 proxy includes a firewall and H.323 proxy gaming related H.323 protocol enhancement including a at least one of the client node and server node codecs.

42. The gaming server node of claim 33, wherein the H.323 network comprises a call control element configured to send, in response to a set-up message from the server node, a media destination address to the gaming server node and the gaming client node, and wherein the gaming server node is configured to send media directly to the media destination address using the server node codec at the gaming server node and the client node codec at the gaming client node.

43. The gaming server node of claim 33, wherein the H.323 network comprises a call control element configured to send, in response to set-up messages from the client node and the server node, respectively, a media destination address to a client call control device associated with the gaming client node and to a server call control device associated with the gaming server node, wherein the gaming client and the gaming server nodes are configured to send media to respective ones of the client and server call control devices via respective ones of the client node and server node codecs, and wherein the client and server call control devices are configured to communicate the media to each other.

44. A gatekeeper node for a computerized server/client gaming arrangement for using a H.323 network to communicate multimedia gaming data between a gaming server and a plurality of gaming clients, wherein the H.323 network is arranged to be controlled by a gatekeeper node, wherein the gaming clients are real-time gaming client applications operable on respective gaming client nodes having respective client node codecs of gaming related protocol enhancements of respective client node H.323 multimedia call clients, wherein the gatekeeper node comprises:

a gatekeeper node gaming related H.323 protocol enhancement according to at least one of a client node codec of a gaming related protocol enhancement of a client node H.323 multimedia call client and a server node codec of a gaming related protocol enhancement of a server node H.323 multimedia call client, and a gaming server use monitoring arrangement configured to cooperate with the gatekeeper node gaming related H.323 protocol enhancement to create a gaming server use billing record, wherein the client node codec is configured:
a) to use RTP over UDP packet communication in communicating with the server node,
b) to decode gaming client input control information from a gaming control information data packet generated in the server node by a server node codec of a server node gaming related protocol enhancement of the server node H.323 multimedia call client, wherein the server node codec is configured to use RTP over UDP packet communication and to encode gaming server output control information for use as gaming client input control information into the gaming control information data packet containing a type field, a protocol field, and a data field, and
c) to encode gaming client output data information into a gaming data information data packet decodable by the server node gaming related protocol enhancement of the server node H.323 multimedia call client, and wherein the server node codec is configured:
d) to use RTP over UDP packet communication in communicating with the client node,
e) to encode gaming server output control information into a gaming control information data packet for use as gaming client input control information, wherein the gaming control information data packet contains a type field, a protocol field, and a data field, and being decodable by the client node codecs of the gaming related protocol enhancement of the client node H.323 multimedia call clients, and
f) to decode gaming client output data information from a gaming data information data packet generated by the client node codecs of the gaming related protocol enhancement of the client node H.323 multimedia call clients.

45. The gatekeeper node of claim 44, further comprising at least one firewall and H.323 proxy, and wherein the H.323 proxy includes a firewall and H.323 proxy gaming related H.323 protocol enhancement including a at least one of the client node and server node codecs.

46. The gatekeeper node of claim 44, wherein the type field includes a gaming data message identifier or a gaming control message identifier.

47. The gatekeeper node of claim 44, further comprising a means for generating a control information time stamp from time information of a header of a RTP data packet carrying the gaming control information, or a means for generating a data information time stamp from time information of a header of a RTP data packet carrying the gaming data information.

48. The gatekeeper node of claim 44, further comprising a means for generating a control information sequence number from sequence number information of a header of a RTP data packet carrying the control information, or a means for generating a data information sequence number from sequence number information of a header of a RTP data packet carrying the data information.

49. The gatekeeper node of claim 44, wherein the client node and server node codecs are provided by a common real-time gaming codec being identified to any of the server node and client node H.323 multimedia call clients by an ASN.1 listing according to ITU Recommendation H.245.

50. The gatekeeper node of claim 44, wherein the control information includes information specifying a rate at which data is to be sent to the server.

51. The gatekeeper node of claim 50, wherein the gaming control information includes information specifying a data type to which the rate at which data is to be sent to the server node is applicable.

52. A firewall node for a computerized server/client gaming arrangement for using a H.323 network to communicate multimedia gaming data between a gaming server and a plurality of gaming clients, wherein the H.323 network is configured to be controlled by a gatekeeper node, wherein the gaming clients are real-time gaming client applications operable on respective gaming client nodes having respective client node codecs of gaming related protocol enhancements of respective client node H.323 multimedia call clients, wherein the firewall node comprises:

a client node gaming related H.323 protocol enhancement according to at least one of a client node codec of a gaming related protocol enhancement of a client node H.323 multimedia call client and a server node codec of a gaming related protocol enhancement of a server node H.323 multimedia call client, and a gaming server use monitoring arrangement configured to cooperate with the gatekeeper node gaming related H.323 protocol enhancement to create a gaming server use billing record, wherein the client node codec is configured:
a) to use RTP over UDP packet communication in communicating with the server node,
b) to decode gaming client input control information from a gaming control information data packet generated in the server node by a server node codec of a server node gaming related protocol enhancement of the server node H.323 multimedia call client, and
c) to encode gaming client output data information into a gaming data information data packet decodable by the server node codec of the server node gaming related protocol enhancement of the server node H.323 multimedia call client, wherein the gaming data information data packet contains a type field, a protocol field, and a data field, and wherein the server node codec is configured:
d) to use RTP over UDP packet communication in communicating with the client node,
e) to encode gaming server output control information into the gaming control information data packet for use as the gaming client input control information, wherein the gaming control information data packet contains a type field, a protocol field, and a data field, and is decodable by the client node codecs of the gaming related protocol enhancement of the client node H.323 multimedia call clients, and
f) to decode the gaming client output data information from the gaming data information data packet generated by the client node codec of the gaming related protocol enhancement of the client node H.323 multimedia call client.

53. The firewall node of claim 52, further comprising a H.323 proxy having a the gaming related H.323 protocol enhancement including at least one of the client node and server node codecs.

54. The firewall node of claim 52, wherein the type field includes a gaming data message identifier or a gaming control message identifier.

55. The firewall node of claim 52, wherein the client node and server node codecs are provided by a common real-time gaming codec being identified to any of the server node and client node H.323 multimedia call clients by an ASN.1 listing according to ITU Recommendation H.245.

56. The gatekeeper node of claim 52, wherein the control information includes information specifying a rate at which data is to be sent to the server.

57. The firewall node of claim 56, wherein the gaming control information includes information specifying a data type to which the rate at which data is to be sent to the server node is applicable.

* * * * *